US010924692B2

(12) United States Patent
Ortiz Egea et al.

(10) Patent No.: US 10,924,692 B2
(45) Date of Patent: Feb. 16, 2021

(54) DEPTH AND MULTI-SPECTRAL CAMERA

(71) Applicant: Microsoft Technology Licensing, LLC, Redmond, WA (US)

(72) Inventors: Sergio Ortiz Egea, San Jose, CA (US); Michael Scott Fenton, Sunnyvale, CA (US); Cyrus Soli Bamji, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/974,572

(22) Filed: May 8, 2018

(65) Prior Publication Data
US 2019/0349536 A1 Nov. 14, 2019

(51) Int. Cl.
*H04N 5/33* (2006.01)
*H04N 5/225* (2006.01)
(Continued)

(52) U.S. Cl.
CPC ............. *H04N 5/332* (2013.01); *G01S 17/89* (2013.01); *H04N 5/2253* (2013.01);
(Continued)

(58) Field of Classification Search
None
See application file for complete search history.

(56) References Cited

U.S. PATENT DOCUMENTS 5,619,355 A    4/1997 Sharp et al.
5,936,739 A *  8/1999 Cameron ........... G01N 21/4795
                                              356/441
(Continued)

FOREIGN PATENT DOCUMENTS

EP     1058147 A2    12/2000
WO     9510065 A1     4/1995
(Continued)

OTHER PUBLICATIONS

IP.Com search report.*
(Continued)

*Primary Examiner* — Mohammad J Rahman
(74) *Attorney, Agent, or Firm* — Alleman Hall Creasman & Tuttle LLP

(57) ABSTRACT

A camera includes a time-of-flight illuminator configured to emit active IR light and a plurality of spectral illuminators, each spectral illuminator configured to emit active spectral light in a different spectral light sub-band. The camera further includes a sensor array that includes a plurality of differential sensors. Each differential sensor is configured to differentially measure both 1) the active IR light, and 2) the active spectral light in each of the different spectral light sub-bands. The camera further includes an output machine operatively connected to the sensor array. The output machine is configured to output a matrix of pixels based on time-multiplexed measurements of the sensor array. Each pixel of the matrix includes 1) a depth value, and 2) a plurality of spectral values. Each of the plurality of spectral values corresponds to a spectral light sub-band of one of the plurality of spectral illuminators.

21 Claims, 6 Drawing Sheets

(51) Int. Cl.
H04N 5/235 (2006.01)
G01S 17/89 (2020.01)

(52) U.S. Cl.
CPC ......... *H04N 5/2254* (2013.01); *H04N 5/2256* (2013.01); *H04N 5/2354* (2013.01)

(56) References Cited

U.S. PATENT DOCUMENTS

| | | | |
|---|---|---|---|
| 6,403,947 B1* | 6/2002 | Hoyt | B82Y 10/00 |
| | | | 250/226 |
| 6,456,793 B1 | 9/2002 | Ray et al. | |
| 6,633,354 B2 | 10/2003 | Li et al. | |
| 7,164,117 B2* | 1/2007 | Breed | B60R 21/01516 |
| | | | 250/208.1 |
| 7,187,452 B2 | 3/2007 | Jupp et al. | |
| 7,310,125 B2 | 12/2007 | Kim et al. | |
| 7,342,658 B2 | 3/2008 | Kowarz et al. | |
| 7,375,803 B1 | 5/2008 | Bamji | |
| 7,420,656 B1 | 9/2008 | Sandusky et al. | |
| 7,446,299 B2 | 11/2008 | Kobayashi | |
| 7,652,736 B2 | 1/2010 | Padiyath et al. | |
| 7,835,002 B2 | 11/2010 | Muhammed et al. | |
| 7,994,465 B1* | 8/2011 | Bamji | G01S 17/36 |
| | | | 250/214 R |
| 8,109,634 B2 | 2/2012 | Gil | |
| 8,780,113 B1 | 7/2014 | Ciurea et al. | |
| 9,060,110 B2 | 6/2015 | Imai | |
| 9,316,865 B2 | 4/2016 | Osterman et al. | |
| 9,551,616 B2 | 1/2017 | McQuilkin et al. | |
| 9,595,239 B2 | 3/2017 | Drolet et al. | |
| 9,602,807 B2 | 3/2017 | Crane et al. | |
| 9,625,569 B2 | 4/2017 | Lange | |
| 9,823,128 B2 | 11/2017 | Pau et al. | |
| 10,180,385 B2 | 1/2019 | Fox et al. | |
| 10,334,187 B2 | 6/2019 | Reed et al. | |
| 2002/0060784 A1* | 5/2002 | Pack | G01S 17/89 |
| | | | 356/6 |
| 2002/0070349 A1* | 6/2002 | Hoyt | G01N 21/6445 |
| | | | 250/458.1 |
| 2003/0132394 A1* | 7/2003 | Wolleschensky | G01N 21/6458 |
| | | | 250/458.1 |
| 2003/0171677 A1* | 9/2003 | Marmarelis | A61B 8/0858 |
| | | | 600/441 |
| 2004/0135955 A1 | 7/2004 | Hong | |
| 2004/0263732 A1 | 12/2004 | Jurg | |
| 2005/0046584 A1* | 3/2005 | Breed | B60C 11/24 |
| | | | 340/13.31 |
| 2005/0099373 A1 | 5/2005 | Jurg et al. | |
| 2005/0192727 A1* | 9/2005 | Shostak | B60C 11/24 |
| | | | 701/37 |
| 2005/0273218 A1* | 12/2005 | Breed | B60C 11/24 |
| | | | 701/2 |
| 2006/0025897 A1* | 2/2006 | Shostak | B60C 23/005 |
| | | | 701/1 |
| 2006/0180371 A1* | 8/2006 | Breed | G07C 5/008 |
| | | | 180/197 |
| 2006/0208169 A1* | 9/2006 | Breed | B60N 2/002 |
| | | | 250/221 |
| 2007/0158533 A1* | 7/2007 | Bamji | H04N 5/335 |
| | | | 250/208.1 |
| 2008/0123097 A1* | 5/2008 | Muhammed | G01J 3/02 |
| | | | 356/419 |
| 2008/0284575 A1* | 11/2008 | Breed | B60C 23/0493 |
| | | | 340/438 |
| 2010/0091611 A1* | 4/2010 | Laake | G01V 1/30 |
| | | | 367/38 |
| 2010/0140461 A1 | 6/2010 | Sprigle et al. | |
| 2011/0285980 A1* | 11/2011 | Newbury | G01S 7/484 |
| | | | 356/3 |
| 2011/0294543 A1* | 12/2011 | Lapstun | H04N 1/00129 |
| | | | 455/556.1 |
| 2012/0019834 A1 | 1/2012 | Bornhop | |
| 2012/0188347 A1 | 7/2012 | Mitchell | |
| 2012/0287247 A1 | 11/2012 | Stenger et al. | |
| 2012/0320157 A1* | 12/2012 | Junuzovic | G03B 17/54 |
| | | | 348/46 |
| 2013/0038690 A1 | 2/2013 | Mitchell et al. | |
| 2013/0101176 A1 | 4/2013 | Park et al. | |
| 2013/0188065 A1* | 7/2013 | Wegener | H04N 5/232 |
| | | | 348/207.99 |
| 2013/0215235 A1 | 8/2013 | Russell | |
| 2013/0215483 A1 | 8/2013 | Han et al. | |
| 2013/0218498 A1* | 8/2013 | Droit | G01D 5/48 |
| | | | 702/79 |
| 2014/0078459 A1 | 3/2014 | Kim et al. | |
| 2014/0092255 A1* | 4/2014 | Choiniere | G06T 7/337 |
| | | | 348/164 |
| 2014/0098689 A1* | 4/2014 | Lee | H04B 7/0469 |
| | | | 370/252 |
| 2014/0145281 A1* | 5/2014 | Bever | G01S 7/4914 |
| | | | 257/431 |
| 2014/0152944 A1 | 6/2014 | Zhao | |
| 2014/0232912 A1 | 8/2014 | Morimoto | |
| 2014/0240692 A1* | 8/2014 | Tien | G01S 17/89 |
| | | | 356/5.01 |
| 2014/0313376 A1 | 10/2014 | Van nieuwenhove et al. | |
| 2014/0327837 A1 | 11/2014 | Osterman et al. | |
| 2014/0378843 A1 | 12/2014 | Valdes et al. | |
| 2015/0163474 A1 | 6/2015 | You et al. | |
| 2015/0256767 A1 | 9/2015 | Schlechter | |
| 2015/0304637 A1 | 10/2015 | Shin et al. | |
| 2016/0027313 A1* | 1/2016 | Loussides | G01S 17/933 |
| | | | 701/16 |
| 2016/0033806 A1 | 2/2016 | Lavrentovich et al. | |
| 2016/0086318 A1* | 3/2016 | Hannuksela | G01S 17/89 |
| | | | 348/43 |
| 2016/0103015 A1 | 4/2016 | Ichihashi | |
| 2016/0146595 A1* | 5/2016 | Boufounos | G01S 17/89 |
| | | | 348/47 |
| 2016/0292626 A1* | 10/2016 | Green | G06Q 50/02 |
| 2017/0059408 A1* | 3/2017 | Korner | G01B 11/2536 |
| 2017/0059858 A1* | 3/2017 | Tilleman | H04N 5/232 |
| 2017/0131096 A1* | 5/2017 | Karlov | G01C 1/08 |
| 2017/0140221 A1 | 5/2017 | Ollila et al. | |
| 2017/0218686 A1 | 8/2017 | Galstian | |
| 2017/0230551 A1 | 8/2017 | Akkaya et al. | |
| 2017/0234985 A1* | 8/2017 | Kadambi | G01S 17/10 |
| | | | 702/152 |
| 2017/0248811 A1 | 8/2017 | Clemen, Jr. et al. | |
| 2017/0272651 A1 | 9/2017 | Mathy et al. | |
| 2017/0332029 A1* | 11/2017 | Feick | H04N 5/37457 |
| 2018/0010936 A1* | 1/2018 | Simeonov | G01B 21/18 |
| 2018/0064399 A1* | 3/2018 | Buettgen | G06K 9/2036 |
| 2018/0270474 A1* | 9/2018 | Liu | G06K 9/00201 |
| 2018/0303574 A1* | 10/2018 | Ramirez Luna | A61B 90/37 |
| 2018/0376067 A1* | 12/2018 | Martineau | H04N 5/2353 |
| 2019/0306386 A1 | 10/2019 | Akkaya et al. | |
| 2019/0364254 A1 | 11/2019 | Ortiz Egea et al. | |

FOREIGN PATENT DOCUMENTS

| | | |
|---|---|---|
| WO | 2012057558 A2 | 5/2012 |
| WO | 2017149370 A1 | 9/2017 |

OTHER PUBLICATIONS

Clara et al., "Snapshot Difference Imaging using Time-of-Flight Sensors", Computer Vision and Pattern Recognition, May 19, 2017 (Year: 2017).*

Conroy, et al., "A power-saving modulation technique for time-of-flight range imaging sensors", In Proceedings of SPIE Videometrics, Range Imaging, and Applications XI, vol. 8085, Jun. 21, 2011, 13 Pages.

Crabb, et al., "Fast single-frequency time-of-flight range imaging", In Proceedings of IEEE Conference on Computer Vision and Pattern Recognition Workshops, Jun. 7, 2015, pp. 58-65.

Droeschel, et al., "Multi-Frequency Phase Unwrapping for Time-of-Flight Cameras", In Proceedings of IEEE/RSJ International Conference on Intelligent Robots and Systems, Oct. 18, 2010, 7 Pages.

(56) References Cited

OTHER PUBLICATIONS

Kirmani, et al., "SPUMIC: Simultaneous Phase Unwrapping and Multipath Interference Cancellation in Time-of-Flight Cameras Using Spectral Methods", In Proceedings of IEEE International Conference on Multimedia and Expo, Jul. 15, 2013, 6 Pages.

Kumar, et al., "Low Power Time-of-Flight 3D Imager System in Standard CMOS", In Proceedings of 19th IEEE International Conference on Electronics, Circuits and Systems, Dec. 9, 2012, pp. 941-944.

Li, Larry, "Time-of-Flight Camera—An Introduction", In Technical White Paper, Jan. 2014, 10 Pages.

Hansard et al., "Time of Flight Cameras: Principles, Methods, and Applications" Springer Briefs in Computer Science, Nov. 2012, 102 pages.

Bamji et al., "A 0.13 µm CMOS System-on-Chip for a 512×424 Time-of-Flight Image Sensor With Multi-Frequency Photo-Demodulation up to 130 MHz and 2 GS/s ADC," IEEE Journal of Solid-State Circuits, vol. 50, No. 1, Jan. 2015, 17 pages.

"Multispectral Optical Filter Assemblies", Retrieved From https://web.archive.org/web/20130912193244/https:/www.photonicsonline.com/doc/multispectral-optical-filter-assemblies-0001, Sep. 12, 2013, 1 Page.

Akkaya, Onur C.., "Camera with Optical Shutter over Sensor Array", Filed Date: Mar. 29, 2018, 18 Pages.

Hans, et al., "Techniques and Applications of Hyperspectral Image Analysis", Published in John Wiley & Sons, Jan. 1, 2007.

Hansard, et al., "Time-of-Flight Cameras: Principles, Methods and Applications", Published in Springer Briefs in Computer Science, Dec. 7, 2012, 103 Pages.

Kim, et al., "A 1.5Mpixel RGBZ CMOS Image Sensor for Simultaneous Color and Range Image Capture", In Proceedings of IEEE International Solid-State Circuits Conference Digest of Technical Papers, Feb. 19, 2012, pp. 391-393.

Mathies, Daven, "Panasonic's new organic sensor can switch between visible and NIR sensitivity", Retrieved from: https://www.digitaltrends.com/photography/panasonic-organic-visible-nir-sensor/, Feb. 10, 2017, 6 Pages.

Xiang, et al., "Electrically Tunable Selective Reflection of Light from Ultraviolet to Visible and Infrared by Heliconical Cholesterics", In Journal of Advanced Materials, vol. 27, Issue 19, Mar. 27, 2015, pp. 3014-3018.

"Notice of Allowance Issued in U.S. Appl. No. 15/987,852", dated Jun. 27, 2019, 8 Pages.

Chang, Chein-I, "Hyperspectral Imaging: Techniques for Spectral Detection and Classification", In Publication of Springer Science & Business Media, Jul. 31, 2003, 372 Pages.

"International Search Report and Written Opinion Issued in PCT Application No. PCT/US2019/023495", dated Jun. 17, 2019, 11 Pages.

Zanuttigh, et al., "Time-of-Flight and Structured Light Depth Cameras: Technology and Applications", Published by Springer International Publishing, Jan. 2016, 360 Pages.

"International Search Report and Written Opinion Issued in PCT Patent Application No. PCT/US19/030985", dated Jul. 30, 2019, 12 Pages.

"Non Final Office Action Issued in U.S. Appl. No. 16/002,862", dated Feb. 28, 2020, 34 Pages.

"Final Office Action Issued in U.S. Appl. No. 16/002,862", dated Sep. 4, 2020, 28 Pages.

\* cited by examiner

US 10,924,692 B2

DEPTH AND MULTI-SPECTRAL CAMERA

BACKGROUND

Visible light digital cameras output images that include, for each pixel, a value for each of one or more color channels (e.g., red, green, blue). Visible light cameras can output different values for a particular color channel depending on the ambient light and/or other factors. Depth cameras output images that include, for each pixel, a value indicating a distance to an object locus imaged by that pixel. Two separate cameras may be cooperatively utilized to generate depth images and visible light images of the same object, though from slightly different perspectives.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A camera includes a time-of-flight illuminator configured to emit active IR light and a plurality of spectral illuminators, each spectral illuminator configured to emit active spectral light in a different spectral light sub-band. The camera further includes a sensor array that includes a plurality of differential sensors. Each differential sensor is configured to differentially measure both 1) the active IR light, and 2) the active spectral light in each of the different spectral light sub-bands. The camera further includes an output machine operatively connected to the sensor array. The output machine is configured to output a matrix of pixels based on time-multiplexed measurements of the sensor array. Each pixel of the matrix includes 1) a depth value, and 2) a plurality of spectral values. Each of the plurality of spectral values corresponds to a spectral light sub-band of one of the plurality of spectral illuminators.

DETAILED DESCRIPTION

Figure 1A:
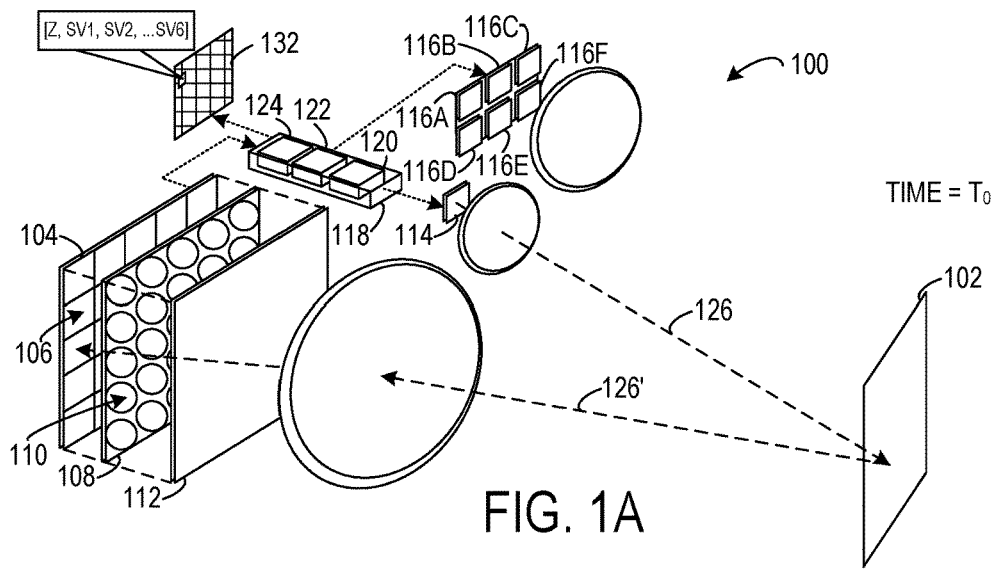
FIGS. 1A-1C are exploded, schematic views showing aspects of an example ambient light-invariant camera.

Images acquired concurrently from different sensor arrays may exhibit parallax, which is objectionable if the images are to be registered to each other. Beam splitting optics may be used to align two sensor arrays on the same optical axis—e.g., a sensor array for producing flat images, and an array for sensing depth values—but this approach can require tight manufacturing tolerances, add mechanical and computational complexity, have thermal stability requirements, and may reduce the signal-to-noise ratio for both flat and depth imaging by dividing the available image intensity between the two arrays.

Attempts to acquire spectral light and depth images using the same sensor array may be complicated by the different wavelength bands used by the respective imaging processes as well as due to variations in ambient light. Spectral light imaging typically uses broadband visible light, such as ambient light as the illumination source, while depth-imaging typically uses narrow-band infrared and/or near infrared light (collectively referred to herein as infrared (IR) light).

It is possible to use a single matrix of image sensors to measure both spectral and IR light by incorporating a specialized array of filter elements arranged in registry with the sensors of the imaging sensor. Such a filter array may include a repeated tiling of subarrays having spectral-transmissive, IR-blocking elements as well as IR-transmissive, spectral-blocking elements. A disadvantage of this approach is that both spectral and IR images are acquired on less than the full area of the sensor array, which decreases both the resolution and the signal-to-noise ratio for both spectral and IR light.

A spectral light image may be biased by ambient light present when the spectral light image is acquired. In particular, ambient light may include a combination of different sub-bands of light in the electromagnetic spectrum (and/or lack different sub-bands of light). Further, the amount of light in the different sub-bands of the ambient light may vary. Such variances in ambient light may bias the appearance of a subject in a spectral light image such that the spectral light image does not reflect the real spectral signature of the subject.

Accordingly, the present description is directed to a multi-spectral camera that overcomes the issues noted above and provides depth and true spectral reflectivity of a subject. The approaches described below are less variant to ambient light.

A camera according to the present disclosure acquires depth images under active, narrow-band IR illumination. Furthermore, the camera acquires, for a plurality of different spectral light sub-bands, spectral light images under active spectral light illumination in the corresponding spectral light sub-band. Both the depth images and the spectral light images are acquired on the same sensor array, which is operated in a time multiplexed manner. The camera uses the depth images to accurately calculate a backscattering (albedo) coefficient for a subject in each of the sub-bands of spectral light in order to accurately determine a true spectral signature of the subject that is not biased by ambient light.

In this disclosure, the term 'spectral' light applies generally to the portion of the electromagnetic spectrum ranging from the ultraviolet to near IR, and thus includes visible light. The term 'visible' is applied to the portion of the electromagnetic spectrum from about 400 to about 700 nanometers (nm. Wavelengths referred to as 'infrared' (IR) include so called near-infrared (NIR) wavelengths of about 850 nm. Depth measurements may be taken using IR light, including NIR light, or any other suitable wavelength.

Figure 1B:
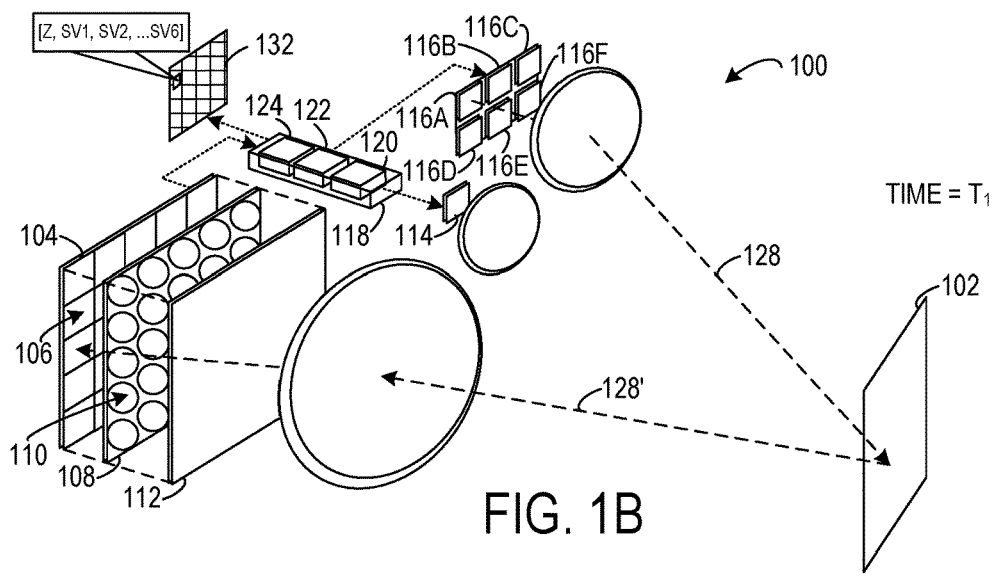
Figure 1C:
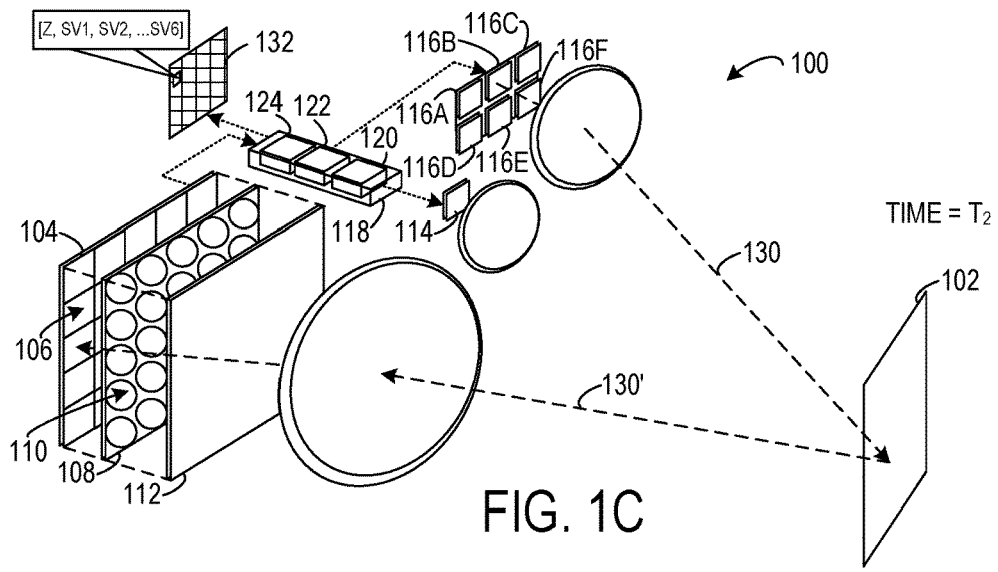

FIGS. 1A-1C shows aspects of an example camera 100. The term 'camera' refers herein to any imaging component having at least one optical aperture and sensor array configured to image a scene or subject 102. Camera 100 includes a sensor array 104 of individually addressable differential sensors 106. In some implementations, the sensors may be complementary metal-oxide semiconductor (CMOS) elements, but other suitable architectures are envisaged as well. Each sensor is responsive to light over a broad wavelength band. For silicon-based sensors, the wavelength response may range from 300 to 1100 nm, for example. Sensor array 104 is schematically illustrated with only twenty-five differential sensors 106 for simplicity, although there is no theoretical limitation to the number of differential sensors 106.

Microlens array 108 optionally may be arranged directly over sensor array 104. Microlens array 108 includes a plurality of microlens elements 110. Each microlens element 110 of microlens array 108 may be registered to a differential sensor 106 of the sensor array 104. When included, microlens array 108 may provide a larger effective fill factor at each of the sensors, for increased collection efficiency and reduced cross-talk between pixels.

Switchable filter 112 optionally may be arranged over sensor array 104, so as to optically cover the sensor array. When included, the switchable filter 112 is switchable electronically between different light-filtering states. In each light-filtering state, the switchable filter 112 transmits light in a particular sub-band and blocks light outside of the sub-band from reaching all differential sensors 106 of the sensor array 104. Blocked light may be absorbed, reflected, and/or scattered by the switchable filter 112, depending on the implementation. The switchable filter 112 may increase a signal-to-noise ratio of IR images and spectral light images acquired by the sensor array 104. The switchable filter 112 may include two or more light filtering states. In one filtering state, the switchable filter 112 may transmit IR light and block light outside of the IR band (e.g., visible light). In another filtering state, the switchable filter 112 may transmit spectral light and block light outside of the spectral sub-band (e.g., IR light). In some implementations, the switchable filter 112 may be configured to switch between a plurality of filtering states that each correspond to a different spectral light sub-band. In each light-filtering state, the switchable filter 112 may be configured to transmit light in a spectral light sub-band and block light outside of the spectral light sub-band (e.g., spectral light in other spectral sub-bands). The switchable filter 112 may switch between any suitable number of different light-filtering states to transmit any suitable sub-band(s) of light while blocking light outside of the sub-band(s). Example sub-bands that correspond to the different light-filtering states of the switchable filter include deep blue (460 nm), blue (470 nm), true green (528 nm), yellow (587 nm), amber (617 nm), red (625 nm), hyper-red (645 nm), far-red (730 nm), and near IR (810 nm).

The switchable filter 112 may include any suitable type of filter that transmits a narrow-band of light without significantly reducing the intensity of the in-band signal received by the sensor array. In one example, the switchable filter may include a plurality of liquid crystal layers.

A time-of-flight illuminator 114 is configured to emit active IR light to illuminate the subject 102. In one example, the time-of-light illuminator 114 includes an IR laser configured to emit IR light. In some implementations, the time-of-light illuminator 114 optionally may include a diffuser covering a field of illumination of the time-of-flight illuminator 114.

A plurality of spectral illuminators 116 (e.g., 116A, 116B, 116C, 116D, 116E, 116F) are each configured to emit active spectral light to illuminate the subject 102 in a different spectral light sub-band. Each of the spectral illuminators may be individually controllable—e.g., a single spectral illuminator may be activated while the other spectral illuminators remain deactivated. The plurality of spectral illuminators 116 may take any suitable form. In one example, the spectral illuminators 116 include light emitting diodes configured to emit spectral light. There is not a theoretical limit on the number of spectral illuminators that may be used, nor on the spectral-light sub-bands that each spectral illuminator may be configured to emit. In one example implementation, a camera may include, in addition to the IR source, six spectral illuminators respectively configured to emit deep blue (460 nm), blue (470 nm), true green (528 nm), yellow (587 nm), amber (617 nm), and red (625 nm). In an example implementation, each spectral illuminator may be may have a full width at half maximum (FWHM) of 20 nm, and a field of illumination (FOI) of 80 degrees. While not required, the camera 100 typically includes more than three spectral illuminators. In some implementations, the spectral illuminators may emit light in other sub-bands, such as hyper-red, near IR, or IR.

Electronic controller 118 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 118 includes a time-of-flight controller machine 120, a spectral controller machine 122, and an output machine 124. Machines 120, 122, 124 may be implemented as separate physical hardware and/or firmware components or incorporated into a single hardware and/or firmware component.

The time-of-flight controller machine 120 is configured to repeatedly (e.g., periodically) activate the time-of-flight illuminator 114 and synchronously address the differential sensors 106 of sensor array 104 to acquire IR images. In the example shown in FIG. 1A, at time $T_0$, the time-of-flight controller machine 120 activates the time-of-flight illuminator 114 to illuminate the subject 102 with active IR light 126 and addresses the differential sensors 106 of sensor array 104 in synchronicity. IR light 126' reflects from the subject 102 back to the camera 100 and is incident on the differential sensors 106 of the sensor array 104 for IR image acquisition. Note that the time-of-flight controller machine 120 may acquire a plurality of IR images in the process of acquiring a depth map.

FIG. 1B shows camera 100 measuring a spectral light sub-band emitted by a first spectral illuminator 116A at time $T_1$. The spectral controller machine 122 is configured to sequentially activate the plurality of spectral illuminates 116 one at a time and synchronously address the differential sensors 106 of sensor array 104. The spectral controller machine 122 may be configured to, for each spectral image acquisition, modulate the frequency of the spectral illuminators 116 in the 100 kilohertz (Khz) to low megahertz (MHz) domain in order to differentially measure the active spectral light and ambient light.

In the example shown in FIG. 1B, at time $T_1$, the spectral controller machine 122 activates a first spectral illuminator 116A to illuminate the subject 102 in spectral light 128 in a sub-band (e.g., blue) of the spectral illuminator 116A, and addresses the differential sensors 106 of sensor array 104. Spectral light 128' reflects from the subject 102 back to the camera 100 and is incident on the exact same differential sensors 106 used to measure the time-of-flight depth to object 102. In FIG. 1B, the same differential sensors are used for spectral light image acquisition in the spectral light sub-band (e.g., blue) of the spectral illuminator 116A.

Further, as shown in FIG. 1C, at time $T_2$, the spectral controller machine 122 activates a second spectral illuminator 116B to illuminate the subject 102 with spectral light 130 in a sub-band (e.g., green) of the spectral illuminator 116B, and addresses the exact same differential sensors 106 of sensor array 104. Spectral light 130' reflects from the subject 102 back to the camera 100 and is incident on the differential sensors 106 of the sensor array for spectral light image acquisition in the sub-band (e.g., green) of the spectral illuminator 116B. The spectral controller machine 122 may sequentially activate the plurality of spectral illuminators 116 one at a time in synchronicity with the sensor array 104 to acquire spectral light images in each of the plurality of sub-bands of the spectral illuminators 116.

Figure 2A:
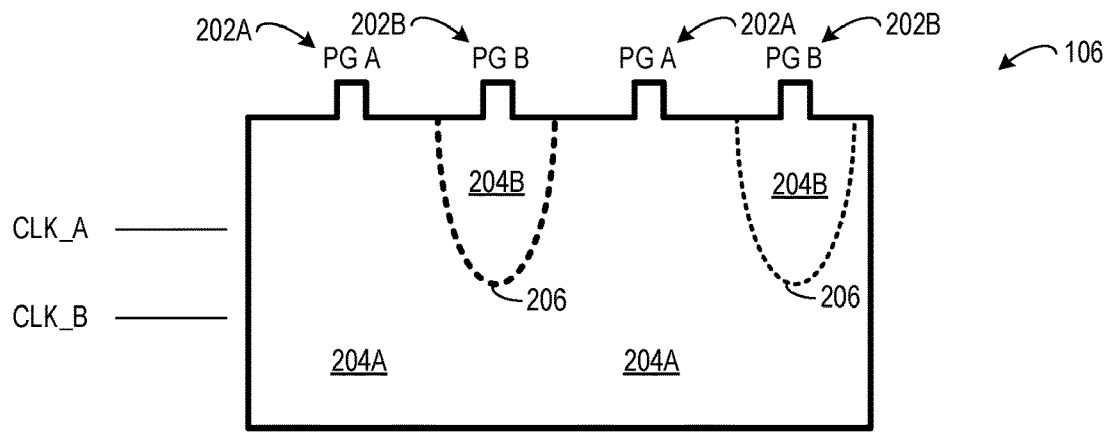
FIGS. 2A-2C schematically show a differential sensor of a sensor array.
Figure 2B:
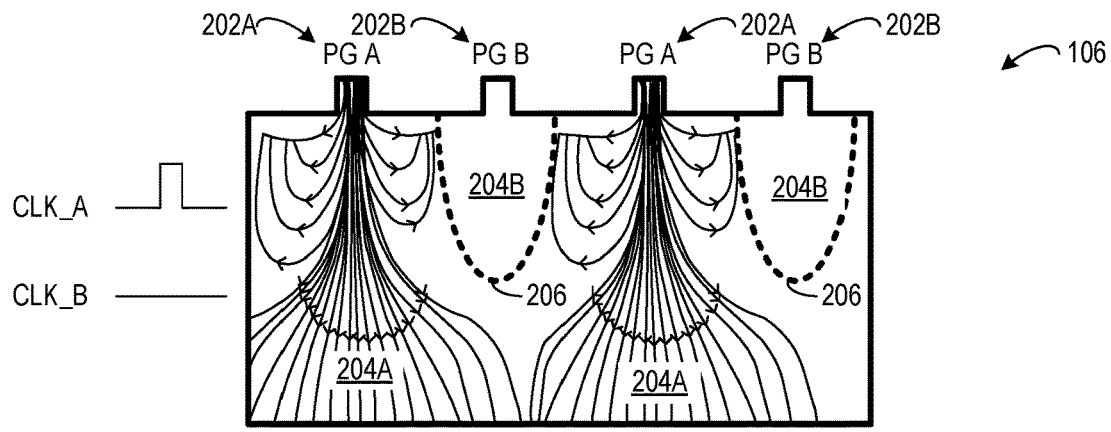
Figure 2C:
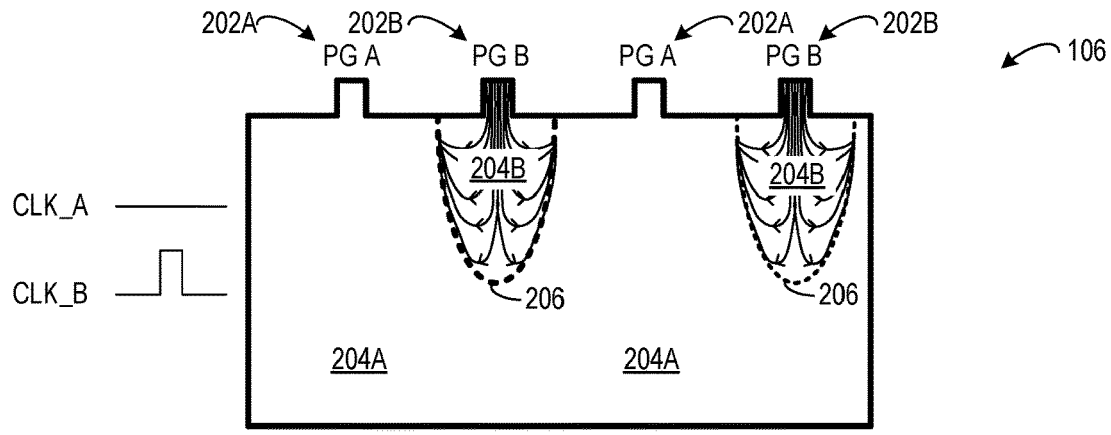

FIGS. 2A, 2B, and 2C are cross-sectional views showing aspects of an example differential sensor 106 of sensor array 104 that may be implemented in an ambient light-invariant, multi-spectral ToF camera, such as the camera 100 shown in FIG. 1. The differential sensor 106 includes first and second polysilicon gates (PG A, PG B) 202A, 202B. The polysilicon gates 202A are energized according to clock signal Clk_A and polysilicon gates 202B are energized according to clock signal Clk_B. The two clock signals are substantially complementary (e.g., Clk_A and Clk_B have 50% duty cycles that are 180 degrees out of phase).

When activated based on the clock signals, the polysilicon gates 202A, 202B create electric fields that respectively attract and collect photoelectric charges in different respective regions 204A, 204B of the differential sensor 106 corresponding to the different polysilicon gates based on the arrival time under the polysilicon gate oxide in the region 204A, 204B. In particular, collected photoelectric charges remain under the gate where the photoelectric charges are initially collected and ultimately diffuse slowly by self-repulsion under each polysilicon gate to a collection node. A p-type doped area 206 between the different regions creates a potential barrier that ensures charges collected by one polysilicon gate do not transfer to an adjacent polysilicon gate even if one is at a higher potential.

In FIG. 2A, both of the clock signals Clk_A and Clk_B are biased to a low voltage such that the polysilicon gates 202A, 202B collect little or no photoelectric charge in the regions 204A, 204B. In FIG. 2B, clock signal Clk_A is biased to a high voltage and Clk_B is biased to a low voltage. When the Clk_A goes high, the polysilicon gates 202A become energized and photoelectric charge is collected in region 204A as indicated by the electric field lines. The electric field lines run tangent to the boundary of region 204A, so charge does not transfer from region 204A to region 204B. Also, since Clk_B is biased low, the polysilicon gates 202B are not energized, and thus minimal photoelectric charge is collected in region 204B. In FIG. 2C, clock signal Clk_B is biased to a high voltage and Clk_A is biased to a low voltage. When the Clk_B goes high, the polysilicon gates 202B become energized and photoelectric charge is collected in region 204B as indicated by the electric field lines. The electric field lines run tangent to the boundary of region 204B, so charge does not transfer from region 204B to region 204A. Also, since Clk_A is biased low, the polysilicon gates 202A are not energized, and thus minimal photoelectric charge is collected in region 204A.

The differential sensor 106 is configured to collect and assign photoelectric charge in synchronicity with modulation of clock signals Clk_A and Clk_B. The photoelectric charge assignment (classification to PG A or B) in the differential sensor 106 occurs simultaneously with charge collection under the polysilicon gates 202A, 202B, and therefore does not require the additional step of shifting charges from one gate to another gate. A differential measurement may be performed during a single integration/readout cycle. In one example, the differential spectral measurement can be performed by synchronously activating a designated spectral illuminator within the 50% time period when the polysilicon gates 202A are energized to collect photoelectric charge from the active illumination in the region 204A. Additionally, the ambient light measurement can be performed by energizing the polysilicon gates 202B while the designated spectral illuminator is deactivated to collect photoelectric charge from the ambient light in the region 204B. The photoelectric charge collected by the region 204B (i.e., the amount of ambient light) is subtracted from the photoelectric charge collected by the region 204A (i.e., the amount of active light and ambient light) to determine a differential measurement in which the ambient light bias is removed from the measurement of the active illumination.

Such operation allows for the same sensor array to be used to measure active light across a broad spectrum including ultraviolet, visible, NIR, and IR light. Further, the differential pixels 106 may reduce system noise because only one read operation is required to perform the differential measurement. Additionally, integration time may be reduced for the differential pixel 106, because the spectral illuminators (and/or IR source) may be pulsed above an operational limit for a short period of time provided that the average time envelope is not exceeded. Moreover, because a single shortened integration period may be used, the total amount of ambient light collected during the integration period may be reduced (e.g., by half). In other ToF camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented in the camera for spectral image acquisition.

The term 'address' as applied to differential sensors 106 of sensor array 104 may have a somewhat different meaning depending on the imaging mode described. For flat-imaging—for spectral light including both visible and IR light—addressing the differential sensors 106 may include integrating the intensity of active light in the sub-band emitted from the designated spectral (or IR) illuminator and received at each differential sensor 106 and associating the integrated intensity of the active light in the sub-band with the portion of the image corresponding to that differential sensor.

For depth imaging, the differential sensors 106 may be addressed differently. Here, addressing the differential sensors may include resolving a phase offset from each sensor relative to the modulated intensity of the IR light. The phase offset, optionally converted into the depth domain, may be associated with the portion of the image corresponding to the differential sensor addressed. In other words, the time-of-flight controller machine 120 may be configured to determine a depth value for each differential sensor of the sensor array. In some implementations, a series of IR image acquisitions (e.g., 6-9) in rapid succession may be used to obtain the phase offset. In combination depth- and flat-imaging applications, both of the above addressing modes may be used in a multiplexed manner.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions (Xi, Yi) of an imaged scene, with a depth value Zi indicating, for each pixel, the depth of the corresponding region. 'Depth' is defined as a coordinate parallel to the optical axis of the camera, which increases with increasing distance from the camera. The term 'depth video' refers herein to a time-resolved sequence of depth maps. In ToF implementations, the illumination source—an IR emitter—may project pulsed or otherwise modulated IR illumination towards the subject. The sensor array of the depth-imaging camera may be configured to detect the phase offset between the illumination reflected back from the subject and the modulated emission. In some implementations, the phase offset of each sensor may be converted into a pixel-resolved time-of-flight of the pulsed illumination, from the illumination source to the subject and then to the array. ToF data may then be converted into depth data.

The term 'spectral light image' refers to a matrix of pixels registered to corresponding regions (Xi, Yi) of an imaged scene, with a spectral value indicating, for each pixel, the spectral signature of the corresponding region in the particular spectral light sub-band. For acquiring the spectral light images in each of the sub-bands (e.g., for a multispectral image), the spectral controller machine 122 is configured to determine a spectral value for each of the differential sensors based on the depth value and a differential measurement of active spectral light and ambient light for the differential sensor.

The depth and multispectral data acquired by the camera 100 may be used to fit a neighborhood of pixels to a regular surface (e.g., Lambertian plane), and solve the backscattering (albedo) coefficient for each of the sub-bands in order to calculate a spectral signature of the surface that is ambient light-invariant and can be robustly classified. In such calculations, the depth data may be used to account for a reduction in light intensity due to optical transmission of the light from the light source (ToF illuminator 114 or spectral illuminators 116) to the subject 102.

In one example, the spectral signature can be calculated using an optical mathematical model that includes the image sensor, L spectral illuminators, and a subject being spectrally classified. According to the optical model, the image sensor (m×n) includes a thin lens having an optical area Ai, a focal length f, and the average optical transmission for the spectral illuminators is characterized as $T_O(\lambda \overline{L})$. The matrix detector is characterized by the pixel size Ad, an average Quantum Efficiency for the L band $QE(\lambda \overline{L})$, and an integration time $\Delta \tau$. The L narrowband, spectral illuminators can be characterized by their spectral radiant intensity $I_L(\overline{\lambda}_L; i, j)$ with an emission time long enough to be considered ergodic, where $I_L(\overline{\lambda}_L)$ is the average central wavelength radiant intensity, for each spectral illuminator. The subject can be modeled as a Lambertian plane, characterized by its normal n̂P(i, j), and its average distance relative to the sensor $\overline{d}$ (i, j), and $\rho(\overline{\lambda}, L)$ the average spectral signature for the sub-band for the spectral illuminator.

According to the optical model, the luminous flux $\Delta\phi_P$ ($\lambda L$; i, j) on the surface patch subtended by the pixel (i, j), on the Lambertian plane using the illuminator L can be calculated using Equation 1:

$$\Delta\phi_P(\overline{\lambda}_L; i, j) = I_L(\overline{\lambda}_L) \frac{A_D(i, j)}{\overline{d}^2(i, j)} \quad \text{Equation 1}$$

The outgoing radiance $L_L(\overline{\lambda}_L; i, j)$ from the surface patch $A_D(i, j)$ can be calculated using Equation 2:

$$L_L(\overline{\lambda}_L; i, j) = \frac{\rho(\overline{\lambda}_L)}{\pi} \frac{\Delta\phi P(\overline{\lambda}_L; i, j)}{A_D(i, j)} \quad \text{Equation 2}$$

The amount of light collected by the camera optics can be calculated using Equation 3:

$$\Delta\phi_O(\overline{\lambda}_L; i, j) = L_L(\overline{\lambda}_L; i, j) \frac{A_D(i, j) A_I}{\overline{d}^2(i, j)} \quad \text{Equation 3}$$

By the principle of the conservation of power, the amount of light that is collected by the detector (i, j) is equivalent to the amount of light collected by the camera optics, except for the attenuation produced by optical transmission of the light $T_O(\overline{\lambda}_L)$, therefore Equation 4 can be used to calculate the light collected by the detector (i, j):

$$\Delta\phi_d(\overline{\lambda}_L; i,j) = T_O(\overline{\lambda}_L) \Delta\phi_O(\overline{\lambda}_L; i,j) \quad \text{Equation 4:}$$

The number of photons detected by the detector for the illuminant L can be calculated using Equation 5, where h is the Planck constant, and c is the speed of light:

$$N_d(\overline{\lambda}_L; i, j) = QE(\overline{\lambda}_L) \frac{\overline{\lambda}_L \cdot \Delta\tau}{h \cdot c} \Delta\phi_d(\overline{\lambda}_L; i, j) \quad \text{Equation 5}$$

The differential sensors of the sensor array enable the ambient light invariant calculation of the spectral signature p ($\lambda \overline{L}$). The sensor array may operate in environments in which parasitic ambient light is present. In order to minimize the effect of the ambient light on the determination of the spectral value, a differential measurement of the active spectral light and the ambient light may be performed. In one example, the spectral illuminator is turned on within a 50% time period in which the first region (i.e., A half) of the differential sensor 106 is activated. Further, the second region (i.e., the B half) of the differential sensor is activated during the other 50% time period in which the spectral illuminator is turned off. The measurement of the photons collected by the B region is subtracted from the measurement of the photons collected by the A region to produce the differential measurement of the active illumination in the sub-band of the spectral illuminator with the ambient light canceled out. The number of photons due to the ambient light can be assessed in a very similar way using the Spectral irradiance $E_a(\lambda)$. The spectral power $\Delta\phi_A(\lambda; i, j)$ on the surface patch $A_D(i, j)$ can be calculated using Equation 6:

$$\Delta\phi_A(\lambda; i,j) = A_D(i,j) E_a(\lambda) \quad \text{Equation 6:}$$

The outgoing radiance due to the ambient light can be calculated using Equation 7:

$$L_A(\lambda; i, j) = \frac{\rho(\overline{\lambda}_L)}{\pi} \frac{\Delta\phi_A(\lambda_L; i, j)}{A_D(i, j)} \quad \text{Equation 7}$$

The amount of spectral power collected by the pixel can be calculated using Equation 8:

$$\Delta\phi_A(\lambda; i, j) = T_O(\lambda) L_A(\lambda; i, j) \frac{A_D(i, j) A_I}{\bar{d}^2(i, j)} \quad \text{Equation 8}$$

The number of photons due to the ambient light can be calculated using Equation 9:

$$N_A(i, j) = \int_{-\infty}^{\infty} QE(\lambda) \frac{\lambda \cdot \Delta\tau}{h \cdot c} \Delta\phi_A(\lambda; i, j) d\lambda \quad \text{Equation 9}$$

The two measurements for the pixel may produce a different number of photons, because during the detection process a certain amount of shot noise is added as shown in Equation 10. With a suitably large number of photons the shot noise (ignoring system noise) can be considered as gaussian and it can be characterized by its variance $\Delta N_A(i, j)$ and $\Delta N_d(i, j)$.

ON: $\tilde{N}_{ON}(i,j) = N_A(i,j) + N_d(i,j) + \Delta[(N_A(i,j) + N_d(i,j)]$

OFF: $\tilde{N}_{off}(i,j) = N_A(i,j) + \Delta N_A(i,j)$ Equation 10:

Accounting for the amount of noise, the number of photoelectrons can be calculated due to the illuminator L by using Equation 11:

$\Delta\tilde{N}_D = N_d(i,j) + \Delta[(N_A(i,j) + N_d(i,j)] - \Delta N_A(i,j)$ Equation 11:

Finally, the estimation of the spectral signature $\tilde{\rho}(\overline{\lambda}_L)$ can be calculated using Equation 12:

$$\tilde{\rho}(\overline{\lambda}_L) = (\Delta\tilde{N}_D + \{\Delta N_A(i, j) - \Delta[(N_A(i, j) + N_d(i, j)]\}) \frac{\pi \bar{d}^4(i, j) \cdot h \cdot c}{I_L(\overline{\lambda}_L) A_D(i, j) \cdot A_I \cdot \overline{\lambda}_L \cdot \Delta\tau \cdot QE(\overline{\lambda}_L)} \quad \text{Equation 12}$$

It will be appreciated that the above is provided as one example, and the spectral signature or spectral value can be calculated using any suitable mathematical model.

Continuing with FIG. 1, the output machine 124 is configured to output a matrix of pixels 132. Each pixel in the matrix includes the depth value (Z) and the spectral value (e.g., SV1, SV2, . . . SV6) for each of the spectral light sub-bands of the plurality of spectral illuminators 116 of the camera 100. The output machine 124 may be configured to output the matrix of pixels 132 in any suitable form. In some examples, the output machine 124 may output the matrix of pixels 132 as a data structure in which each element of the matrix corresponds to a different pixel, and each element of the matrix includes an array of values corresponding to the depth value and the spectral values for that pixel. Note that a spectral value for the IR light sub-band may be determined for each differential sensor in the process of determining the depth value, and thus each pixel in the matrix may include a spectral value for the IR light sub-band.

In some implementations, the time-of-flight illuminator may be activated repeatedly (e.g., periodically) to determine the depth of a subject. For example, a series of IR image acquisitions (e.g., 9) may be used to obtain a phase offset from which depth is derived. Additionally, each of the spectral illuminators may be activated in order to acquire spectral data in each of the different sub-bands of spectral light corresponding to the different spectral illuminators.

The spectral controller machine 122 may be configured to control activation of each of the plurality of spectral illuminators to acquire spectral images in the different sub-bands for the spectral illuminators. Similarly, the time-of-flight controller machine 120 may be configured to control activation of the ToF illuminator to acquire IR images. Activations of the ToF illuminator and the spectral illuminators may be set cooperatively such that ToF measurements and spectral measurements can be performed without interference from other illuminators. In some implementations, each of the plurality of spectral illuminators may be activated less frequently than the time-of-flight illuminator (e.g., 1 activation of each spectral illuminator for every 6-9 activations of the time-of-flight illuminator).

Figure 3:
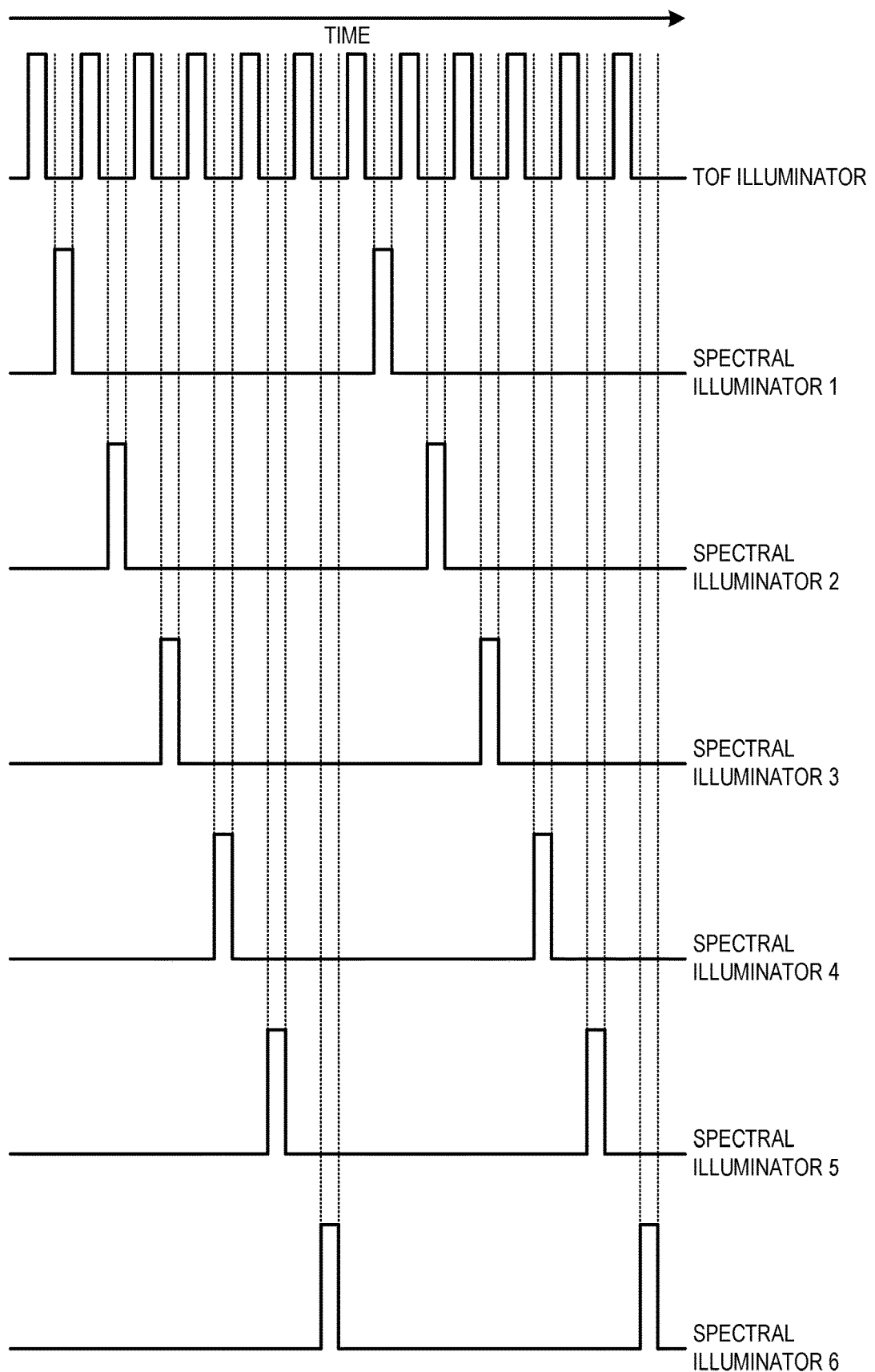
FIGS. 3 and 4 are timing graphs showing different example sequences of operation of different spectral illuminators of an ambient light-invariant camera.
Figure 4:
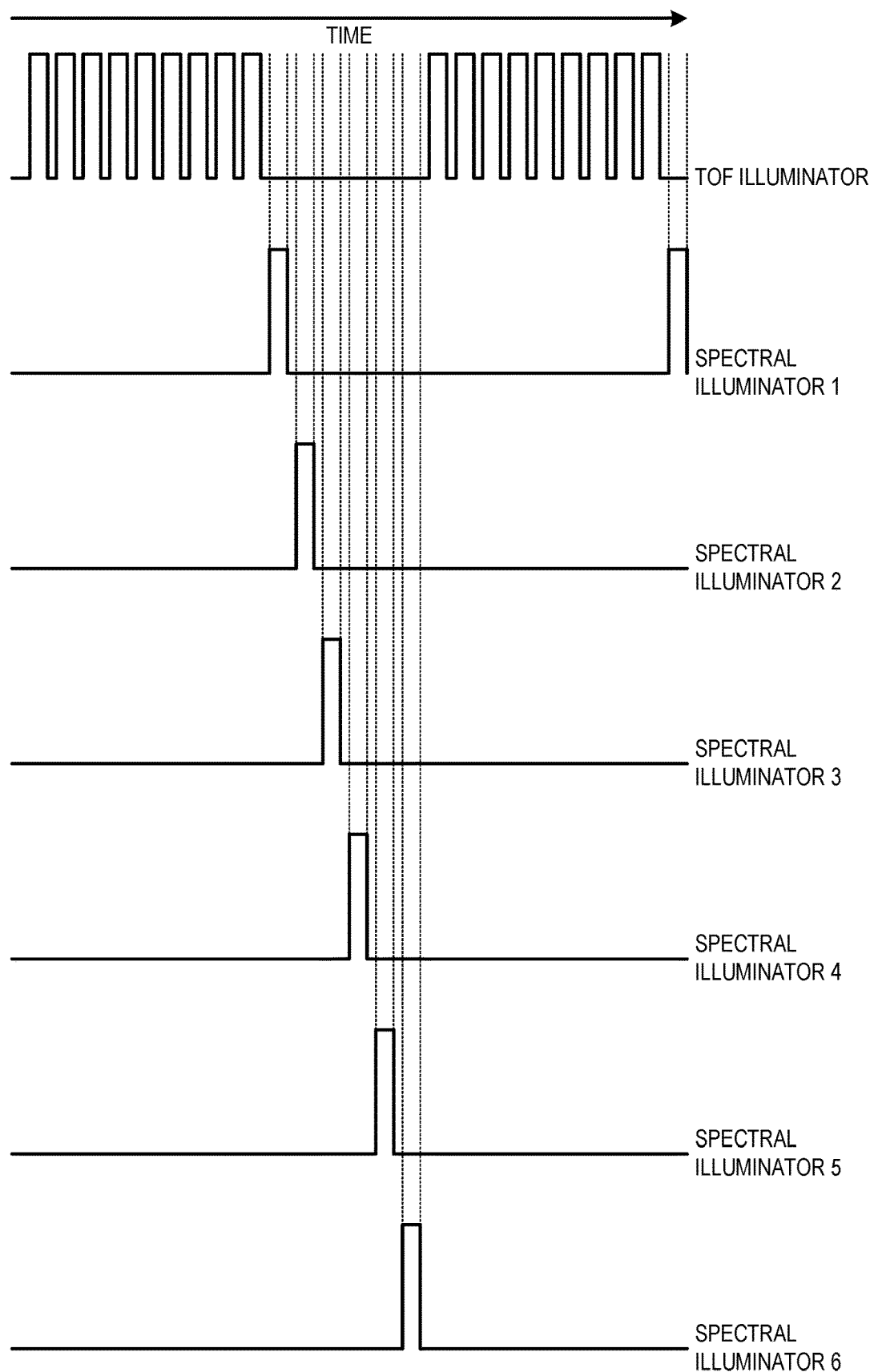

FIGS. 3 and 4 are timing graphs showing different example timing strategies for the camera 100 shown in FIG. 1. Note that the timing graphs depict only activation and deactivation times of the different illuminators. It will be appreciated that parameters of the light (e.g., frequency, amplitude) may be modulated within each activation/deactivation cycle for the different illuminators. For example, during each activation and/or across two or more successive activations, the ToF illuminator may modulate the frequency of IR illumination.

In an example shown in FIG. 3, the ToF illuminator is activated on a periodic basis with a 33% duty cycle. The period is repeated for six activations (e.g., to acquire six IR images) in order to determine the depth of an imaged subject. Furthermore, in the segments of the periods where the ToF illuminator is deactivated, the spectral illuminators are sequentially activated to determine spectral values for the subject in the different sub-bands corresponding to the different spectral illuminators. In other words, a different spectral illuminator is activated each time the ToF illuminator is deactivated. As such, the activations of the different spectral illuminators are interleaved with the activations of the ToF illuminator. This example sequence of operation may advantageously space apart the activations of the ToF illuminator such that the ToF illuminator may be allowed to maintain a suitable operating temperature without overheating.

In another example shown in FIG. 4, the ToF illuminator is activated on a periodic basis with a 66% duty cycle. The period is repeated for nine activations (e.g., to acquire nine IR images) in order to determine the depth of an imaged subject. In this sequence of operation, the activations of the ToF illuminator occur rapidly in succession in a first period while the plurality of spectral illuminators remain deactivated. Once the ToF illuminator has completed the six activations, the spectral illuminators are sequentially activated while the ToF illuminator remains deactivated in a second period. The two periods may be alternately repeated to determine the depth and spectral values for the subject in the different sub-bands corresponding to the different spectral illuminators.

It will be appreciated that the ToF illuminator and the plurality of spectral illuminators may be activated according to any suitable timing strategy.

Figure 5:
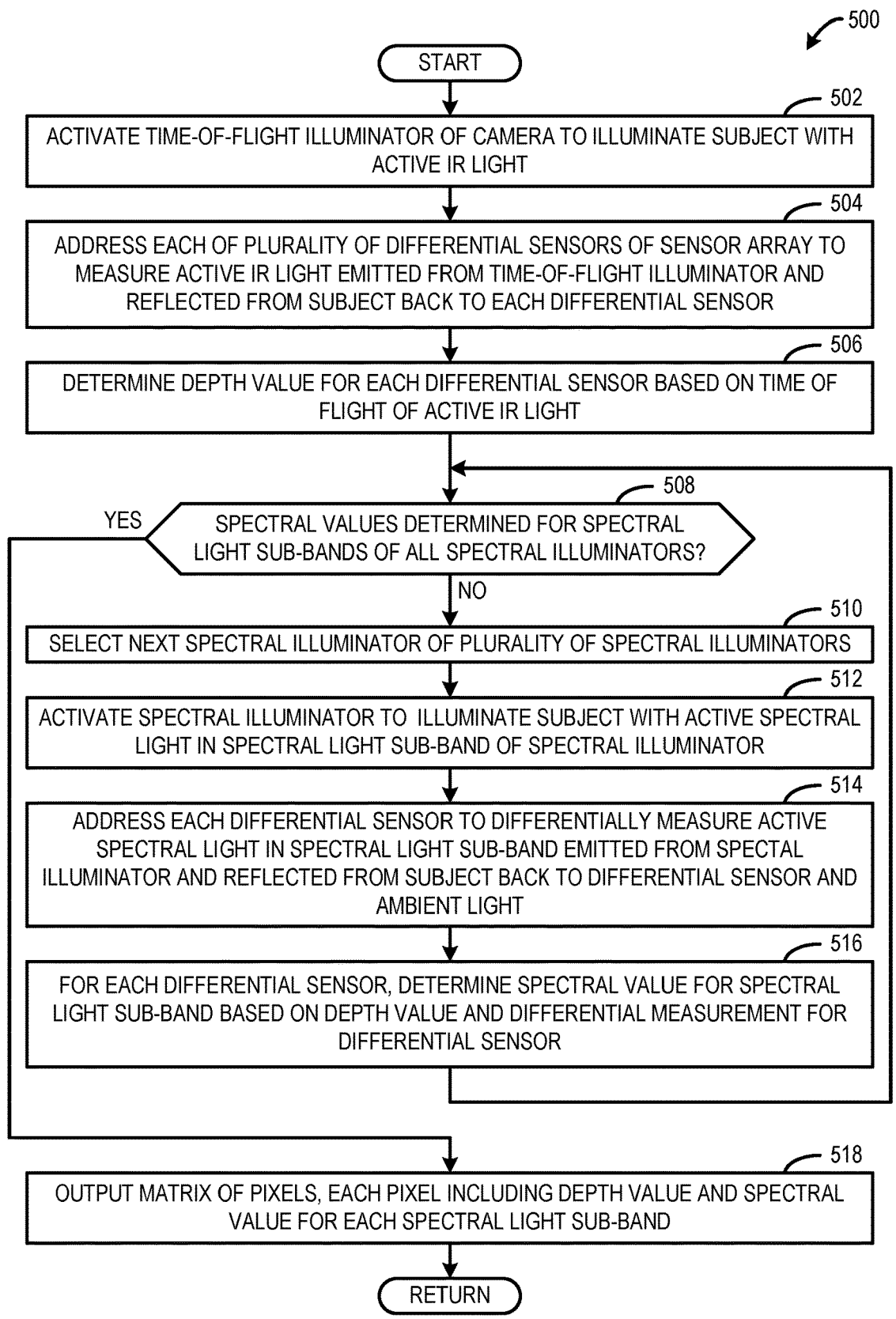
FIG. 5 shows an example ambient light-invariant method of acquiring depth- and multi-spectral-images.

FIG. 5 is a flowchart for an example ambient light-invariant, combination depth- and multi-spectral-image acquisition method 500. For example, method 500 may be enacted by electronic controller 118 of camera 100.

At 502 of method 500, a ToF illuminator of a camera is activated to illuminate a subject with active IR light. At 504 of method 500, each differential sensor of a sensor array of the camera is addressed to measure active IR light emitted from the time-of-flight illuminator and reflected from the subject back to each differential sensor. At 506 of method 500, a depth value is determined for each differential sensor based on a time of flight of the active IR light. In phase-sensitive ToF implementations, the depth value may be resolved based on a phase offset from each sensor element relative to ToF illuminator modulation. In some implementations, each sensor element may be addressed several times to acquire a single-phase capture. At 508 of method 500, it is determined whether spectral values have been determined for sub-bands of all of a plurality of spectral illuminators of the camera. If spectral values have been determined for the sub-bands of the plurality of spectral illuminators, then method 500 moves to 518. Otherwise, method 500 moves to 510. At 510 of method 500, a next spectral illuminator is selected to be activated in order to acquire spectral data in the sub-band for the spectral illuminator. At 512 of method 500, the spectral illuminator is activated to illuminate the subject with active spectral light in the sub-band of the spectral illuminator. At 514 of method 500, each differential sensor of the sensor array is addressed to differentially measure 1) active spectral light emitted from the spectral illuminator and reflected from the subject back to each differential sensor, and 2) ambient light. In some implementations, the differential measurement may be performed within each differential sensor by activating a first region of each differential sensor to measure the active spectral light in the sub-band reflected from the subject back to the differential sensor and activate a second region of each differential sensor to measure the ambient light. These two measurements may be performed during a single period of activation of the spectral illuminator. At 516 of method 500, for each differential sensor, a spectral value for the sub-band is determined based on the depth value and the differential measurement for the differential sensor. Method 500 returns to 508 to determine if spectral values have been determined for all of the sub-bands of the plurality of spectral illuminators. If spectral values have been determined for all of the sub-bands, then method 500 moves to 518. At 518 of method 500, a matrix of pixels is outputted. Each pixel of the matrix includes a depth value and a spectral value for each sub-band of the plurality of spectral illuminators.

In some implementations, the methods and processes described herein may be tied to a computing system of one or more computing devices. In particular, such methods and processes may be implemented as a computer-application program or service, an application-programming interface (API), a library, and/or other computer-program product.

Figure 6:
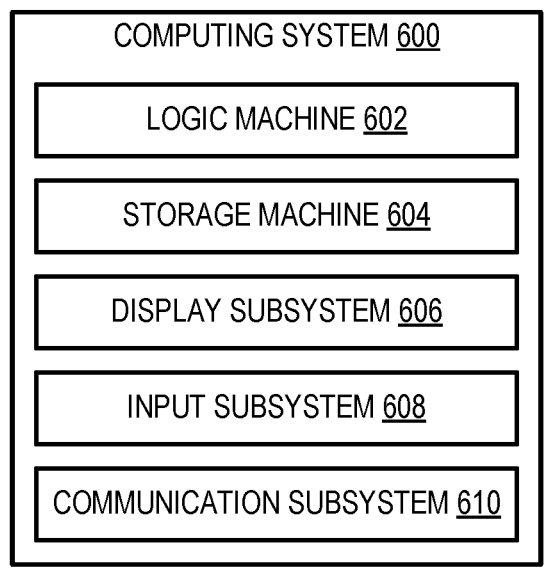
FIG. 6 shows an example computing system.

FIG. 6 schematically shows a non-limiting implementation of a computing system 600 that can enact one or more of the methods and processes described above. Computing system 600 is shown in simplified form. For example, computing system 600 may take the form of camera 100 or electronic controller 118 of FIG. 1.

Computing system 600 includes a logic machine 602 and a storage machine 604. Computing system 600 may optionally include a display subsystem 606, input subsystem 608, communication subsystem 610, and/or other components not shown in FIG. 600.

Logic machine 602 includes one or more physical devices configured to execute instructions. For example, the logic machine 602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 602 may include one or more processors configured to execute software instructions. Additionally or alternatively, the logic machine 602 may include one or more hardware or firmware logic machines configured to execute hardware or firmware instructions. Processors of the logic machine 602 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 602 may be virtualized and executed by remotely accessible, networked computing devices configured in a cloud-computing configuration.

Storage machine 604 includes one or more physical devices configured to hold instructions executable by the logic machine 602 to implement the methods and processes described herein. When such methods and processes are implemented, the state of storage machine 604 may be transformed—e.g., to hold different data.

Storage machine 604 may include semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of display images translating matrix of pixels 132 into a visual format perceivable by a human. As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem 610 may be configured for communication via a wireless telephone network, or a wired or wireless local- or wide-area network. In some embodiments, the communication subsystem 610 may allow computing system 600 to send and/or receive messages to and/or from other devices via a network such as the Internet.

In an example, a camera comprises a sensor array including a plurality of differential sensors each configured to measure light over spectral and infrared (IR) bands, a time-of-flight illuminator configured to emit active IR light in an IR light sub-band, a plurality of spectral illuminators, each spectral illuminator configured to emit active spectral light in a different spectral light sub-band, a time-of-flight controller machine configured to activate the time-of-flight illuminator to illuminate a subject with the active IR light, address each of the differential sensors to measure the active IR light emitted from the time-of-flight illuminator and reflected from the subject back to each of the differential sensors, and determine a depth value for each of the differential sensors based on a time of flight of the active IR light, a spectral controller machine configured to, for each of the plurality of spectral illuminators activate the spectral illuminator to illuminate the subject with active spectral light in the spectral light sub-band of the spectral illuminator, address each of the differential sensors to differentially measure the active spectral light emitted from the spectral illuminator in the spectral light sub-band and reflected from the subject back to the differential sensor and ambient light, and for each of the plurality of differential sensors, determine a spectral value for the spectral light sub-band based on the depth value and a differential measurement for the differential sensor; and an output machine configured to output a matrix of pixels, each pixel including the depth value and the spectral value for each spectral light sub-band. In this example and/or other examples, the time-of-flight illuminator may be configured to modulate the active IR light, and the time-of-flight controller machine may be configured to determine the depth value for each of the differential sensors based on a phase offset of the modulated active IR light reflected from the subject back to the differential sensors. In this example and/or other examples, the time-of-flight controller machine may be configured to, for each of the plurality of differential sensors, determine a spectral value for the IR light sub-band based on a measurement of active IR light emitted from the time-of-flight illuminator and reflected from the subject back to the differential sensor, and the output machine may be configured to output a spectral value for the IR light sub-band. In this example and/or other examples, the time-of-flight controller machine may be configured to repeatedly activate the time-of-flight illuminator to repeatedly illuminate the subject with active IR light, for each activation of the time-of-flight illuminator, address each of the differential sensors to measure the active IR light emitted from the time-of-flight illuminator and reflected from the subject back to the differential sensors, and determine the depth value for each of the differential sensors based on the plurality of measurements of the active IR light emitted from the time-of-flight illuminator and reflected from the subject back to the differential sensors. In this example and/or other examples, the spectral controller machine may be configured to interleave activations of the plurality of spectral illuminators with the activations of the time-of-flight illuminator. In this example and/or other examples, the time-of-flight controller machine may be configured to repeatedly activate the time-of-flight illuminator in a first period, and the spectral controller machine may be configured to individually activate each of the plurality of spectral illuminators in a second period different than the first period. In this example and/or other examples, the camera may include more than three spectral illuminators. In this example and/or other examples, the time-of-flight illuminator may include an IR laser configured to emit IR light. In this example and/or other examples, each of the plurality of spectral illuminators may include a light emitting diode configured to emit spectral light. In this example and/or other examples, each differential sensor may include a first region and a second region each configured to measure spectral light, wherein the spectral controller machine may be configured, for each of the plurality of spectral illuminators, to activate the first region of each of the differential sensors to measure the active spectral light emitted from the spectral illuminator in the spectral light sub-band and reflected from the subject back to the differential sensor and activate the second region of each of the differential sensors to measure the ambient light.

In an example, a depth and multi-spectral image acquisition method, the method comprises activating a time-of-flight illuminator of a camera to illuminate a subject with active IR light in an IR light sub-band, addressing each of a plurality of differential sensors of a sensor array to measure the active IR light emitted from the time-of-flight illuminator and reflected from the subject back to each of the differential sensors, determining a depth value for each of the differential sensors based on a time of flight of the active IR light, for each of a plurality of spectral illuminators of the camera, activating the spectral illuminator to illuminate the subject with active spectral light in a spectral light sub-band of the spectral illuminator, addressing each of the differential sensors to differentially measure the active spectral light emitted from the spectral illuminator in the spectral light sub-band and reflected from the subject back to the differential sensor and ambient light, for each of the plurality of differential sensors, determining a spectral value for the spectral light sub-band based on the depth value and a differential measurement for the differential sensor, and outputting a matrix of pixels, each pixel including the depth value and the spectral value for each spectral light sub-band. In this example and/or other examples, the time-of-flight illuminator may be configured to modulate the active IR light, and the depth value for each of the differential sensors may be determined based on a phase offset of the modulated active IR light reflected from the subject back to the differential sensors. In this example and/or other examples, the method may further comprise for each of the plurality of differential sensors, determining a spectral value for the IR light sub-band based on a measurement of active IR light emitted from the time-of-flight illuminator and reflected from the subject back to the differential sensor, and each pixel of the matrix of pixels may include a spectral value for the IR light sub-band. In this example and/or other examples, the method may further comprise repeatedly activating the time-of-flight illuminator to repeatedly illuminate the subject with active IR light, for each activation of the time-of-flight illuminator, addressing each of the differential sensors to measure the active IR light emitted from the time-of-flight illuminator and reflected from the subject back to the differential sensors, and determining the depth value for each of the differential sensors based on the plurality of measurements of the active IR light emitted from the time-of-flight illuminator and reflected from the subject back to the differential sensors. In this example and/or other examples, the activations of the plurality of spectral illuminators may be interleaved with the activations of the time-of-flight illuminator. In this example and/or other examples, the time-of-flight illuminator may be repeatedly activated in a first period, and each of the plurality of spectral illuminators may be individually activated in a second period different than the first period. In this example and/or other examples, the camera may include more than three spectral illuminators. In this example and/or other examples, the time-of-flight illuminator may include an IR laser configured to emit IR light, and each of the plurality of spectral illuminators may include a light emitting diode configured to emit spectral light. In this example and/or other examples, each differential sensor may include a first region and a second region each configured to measure spectral light, for each of the plurality of spectral illuminators, the first region of each of the differential sensors may be activated to measure the active spectral light in the spectral light sub-band for the spectral illuminator, and the second region of each of the differential sensors may be activated to measure the ambient light.

In an example, a camera comprises a time-of-flight illuminator configured to emit active IR light, a plurality of spectral illuminators, each spectral illuminator configured to emit active spectral light in a different spectral light sub-band, a sensor array including a plurality of differential sensors each configured to differentially measure both the active IR light, and the active spectral light in each of the different spectral light sub-bands, and an output machine operatively connected to the sensor array and configured to output a matrix of pixels based on time-multiplexed measurements of the sensor array, each pixel of the matrix including a depth value and a plurality of spectral values, each spectral value corresponding to a spectral light sub-band of one of the plurality of spectral illuminators.

In an example, a camera comprises a sensor array including a plurality of sensors each configured to measure spectral light, a plurality of spectral illuminators, each spectral illuminator configured to emit active spectral light in a different spectral light sub-band, a spectral controller machine configured to, for each of the plurality of spectral illuminator activate the spectral illuminator to illuminate the subject with active spectral light in the spectral light sub-band of the spectral illuminator, and address each of the sensors to measure the active spectral light in the spectral light sub-band emitted from the spectral illuminator and reflected from the subject back to the sensor, a depth measuring system configured to estimate, for each of the sensors, a depth value indicative of a depth to the subject, and an output machine configured to output a matrix of pixels, each pixel corresponding to one of the plurality of sensors and including a spectral value for each spectral light sub-band, each spectral value calculated based on the depth value estimated for the sensor corresponding to the pixel.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera comprising:
a sensor array including a plurality of differential sensors each configured to measure light over spectral and infrared (IR) bands so as to determine both spectral values and depth values for each of the plurality of differential sensors;
a time-of-flight illuminator configured to emit active IR light in an IR light sub-band;
a plurality of spectral illuminators, each spectral illuminator configured to emit active spectral light in a different spectral light sub-band;
a time-of-flight controller machine configured to:
activate the time-of-flight illuminator to illuminate a subject with the active IR light,
address each of the differential sensors to measure the active IR light emitted from the time-of-flight illuminator and reflected from the subject back to each of the differential sensors, and
determine a depth value for each of the differential sensors based on a time of flight of the active IR light,
a spectral controller machine configured to, for each of the plurality of spectral illuminators:
activate the spectral illuminator to illuminate the subject with active spectral light in the spectral light sub-band of the spectral illuminator,
address each of the differential sensors for a first duration in which the spectral illuminator is activated and address each of the differential sensors for a second duration in which the spectral illuminator is turned off to differentially measure ambient light and the active spectral light emitted from the spectral illuminator in the spectral light sub-band and reflected from the subject back to the differential sensor, and
for each of the plurality of differential sensors, determine a spectral value for the spectral light sub-band based on the depth value and a differential measurement for the differential sensor; and
an output machine configured to output a matrix of pixels, each pixel including the depth value and the spectral value for each spectral light sub-band.

2. The camera of claim 1, wherein the time-of-flight illuminator is configured to modulate the active IR light, and wherein the time-of-flight controller machine is configured to determine the depth value for each of the differential sensors based on a phase offset of the modulated active IR light reflected from the subject back to the differential sensors.

3. The camera of claim 1, wherein the time-of-flight controller machine is configured to, for each of the plurality of differential sensors, determine a spectral value for the IR light sub-band based on a measurement of active IR light emitted from the time-of-flight illuminator and reflected from the subject back to the differential sensor, and wherein the output machine is configured to output a spectral value for the IR light sub-band.

4. The camera of claim 1, wherein the time-of-flight controller machine is configured to:
  repeatedly activate the time-of-flight illuminator to repeatedly illuminate the subject with active IR light,
  for each activation of the time-of-flight illuminator, address each of the differential sensors for a third duration in which the time-of-flight illuminator is activated and address each of the differential sensors for a fourth duration in which the time-of-flight illuminator is turned off to differentially measure the ambient light and the active IR light emitted from the time-of-flight illuminator and reflected from the subject back to the differential sensors, and
  determine the depth value for each of the differential sensors based on the plurality of differential measurements of the ambient light and the active IR light emitted from the time-of-flight illuminator and reflected from the subject back to the differential sensors.

5. The camera of claim 4, wherein the spectral controller machine is configured to interleave activations of the plurality of spectral illuminators with the activations of the time-of-flight illuminator.

6. The camera of claim 4, wherein the time-of-flight controller machine is configured to repeatedly activate the time-of-flight illuminator in a first period, and wherein the spectral controller machine is configured to individually activate each of the plurality of spectral illuminators in a second period different than the first period.

7. The camera of claim 1, wherein the camera includes more than three spectral illuminators.

8. The camera of claim 1, wherein the time-of-flight illuminator includes an IR laser configured to emit IR light.

9. The camera of claim 1, wherein each of the plurality of spectral illuminators includes a light emitting diode configured to emit spectral light.

10. The camera of claim 1, wherein each differential sensor includes a first region and a second region each configured to measure spectral light, wherein the spectral controller machine is configured, for each of the plurality of spectral illuminators, to activate the first region of each of the differential sensors to measure the active spectral light emitted from the spectral illuminator in the spectral light sub-band and reflected from the subject back to the differential sensor and activate the second region of each of the differential sensors to measure the ambient light.

11. A depth and multi-spectral image acquisition method, the method comprising:
  activating a time-of-flight illuminator of a camera to illuminate a subject with active IR light in an IR light sub-band;
  addressing each of a plurality of differential sensors of a sensor array for a first duration in which the time-of-flight illuminator is activated and address each of the differential sensors for a second duration in which the time-of-flight illuminator is turned off to differentially measure ambient light and the active IR light emitted from the time-of-flight illuminator and reflected from the subject back to each of the plurality of differential sensors;
  determining a depth value for each of the plurality of differential sensors based on a time of flight of the active IR light;
  for each of a plurality of spectral illuminators of the camera,
    activating the spectral illuminator to illuminate the subject with active spectral light in a spectral light sub-band of the spectral illuminator,
    addressing each of the plurality of differential sensors for a third duration in which the spectral illuminator is activated and addressing each of the plurality of differential sensors for a fourth duration in which the spectral illuminator is turned off to differentially measure the ambient light and the active spectral light emitted from the spectral illuminator in the spectral light sub-band and reflected from the subject back to the differential sensor,
    for each of the plurality of differential sensors, determining a spectral value for the spectral light sub-band based on the depth value and a differential measurement for the differential sensor; and
  outputting a matrix of pixels, each pixel including the depth value and the spectral value for each spectral light sub-band.

12. The method of claim 11, wherein the time-of-flight illuminator is configured to modulate the active IR light, and the depth value for each of the differential sensors is determined based on a phase offset of the modulated active IR light reflected from the subject back to the differential sensors.

13. The method of claim 12, further comprising:
  for each of the plurality of differential sensors, determining a spectral value for the IR light sub-band based on a measurement of active IR light emitted from the time-of-flight illuminator and reflected from the subject back to the differential sensor, and wherein each pixel of the matrix of pixels includes a spectral value for the IR light sub-band.

14. The method of claim 11, further comprising:
  repeatedly activating the time-of-flight illuminator to repeatedly illuminate the subject with active IR light;
  for each activation of the time-of-flight illuminator, addressing each of the differential sensors for the first duration in which the time-of-flight illuminator is activated and addressing each of the differential sensors for the second duration in which the time-of-flight illuminator is turned off to differentially measure the ambient light and the active IR light emitted from the time-of-flight illuminator and reflected from the subject back to the differential sensors; and
  determining the depth value for each of the differential sensors based on the plurality of differential measurements of the ambient light and the active IR light emitted from the time-of-flight illuminator and reflected from the subject back to the differential sensors.

15. The method of claim 14, wherein the activations of the plurality of spectral illuminators are interleaved with the activations of the time-of-flight illuminator.

16. The method of claim 14, wherein the time-of-flight illuminator is repeatedly activated in a first period, and wherein each of the plurality of spectral illuminators is individually activated in a second period different than the first period.

17. The method of claim 11, wherein the camera includes more than three spectral illuminators.

18. The method of claim 11, wherein the time-of-flight illuminator includes an IR laser configured to emit IR light, and wherein each of the plurality of spectral illuminators includes a light emitting diode configured to emit spectral light.

19. The method of claim 11, wherein each differential sensor includes a first region and a second region each configured to measure spectral light, wherein for each of the plurality of spectral illuminators, the first region of each of the differential sensors is activated to measure the active spectral light in the spectral light sub-band for the spectral illuminator, and wherein the second region of each of the differential sensors is activated to measure the ambient light.

20. A camera comprising:
a time-of-flight illuminator configured to emit active IR light;
a plurality of spectral illuminators, each spectral illuminator configured to emit active spectral light in a different spectral light sub-band;
a sensor array including a plurality of differential sensors each configured to differentially measure both:
the active IR light for a first duration in which the time-of-flight illuminator is activated and a second duration in which the time-of-flight illuminator is turned off to differentially measure ambient light and the active IR light emitted from the time-of-flight illuminator and reflected from a subject back to the differential sensor, and
the active spectral light in each of the different spectral light sub-bands for a third duration in which the spectral illuminator emitting the active spectral light in the different spectral light sub-band is activated and a fourth duration in which the spectral illuminator is turned off to differentially measure the ambient light and the active spectral light emitted from the spectral illuminator in the spectral light sub-band and reflected from the subject back to the differential sensor; and
an output machine operatively connected to the sensor array and configured to output a matrix of pixels based on time-multiplexed measurements of the sensor array, each pixel of the matrix including a depth value and a plurality of spectral values, each spectral value corresponding to a spectral light sub-band of one of the plurality of spectral illuminators.

21. A camera comprising:
a sensor array including a plurality of sensors each configured to measure spectral light and IR light so as to determine both spectral values and depth values for each of the plurality of sensors;
a plurality of spectral illuminators, each spectral illuminator configured to emit active spectral light in a different spectral light sub-band;
a spectral controller machine configured to, for each of the plurality of spectral illuminators:
activate the spectral illuminator to illuminate the subject with active spectral light in the spectral light sub-band of the spectral illuminator, and
address each of the sensors to measure the active spectral light in the spectral light sub-band emitted from the spectral illuminator and reflected from the subject back to the sensor;
a depth measuring system configured to estimate, for each of the sensors, a depth value indicative of a depth to the subject;
calculate, for each of the sensors, a spectral value for each spectral light sub-band based on both the active spectral light measured by the sensor and the depth value estimated for the sensor; and
an output machine configured to output a matrix of pixels, each pixel corresponding to one of the plurality of sensors and including the spectral value for each spectral light sub-band.

\* \* \* \* \*